Jan. 6, 1970   O. L. HOWARD   3,487,605
METHOD OF HANDLING PRODUCE OR OTHER PRODUCTS AND
APPARATUS FOR PERFORMING THE METHOD
Filed March 14, 1966   8 Sheets-Sheet 1
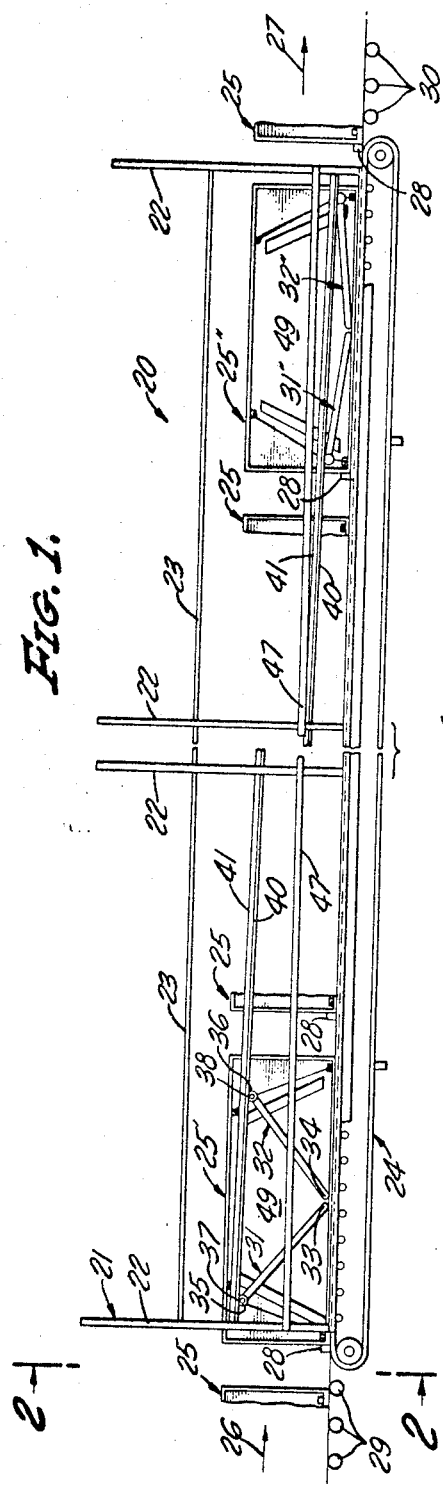
ORVILLE L. HOWARD
INVENTOR.
KENDRICK, SUBKOW and STOLZY
BY
ATTORNEYS Jan. 6, 1970  O. L. HOWARD  3,487,605
METHOD OF HANDLING PRODUCE OR OTHER PRODUCTS AND
APPARATUS FOR PERFORMING THE METHOD
Filed March 14, 1966  8 Sheets-Sheet 2

ORVILLE L. HOWARD
INVENTOR.

KENDRICK, SUBKOW and STOLZY
BY
ATTORNEYS

ORVILLE L. HOWARD
INVENTOR.

KENDRICK, SUBKOW and STOLZY
BY

ATTORNEYS

Jan. 6, 1970　　　　　　　O. L. HOWARD　　　　　3,487,605
　　　　　METHOD OF HANDLING PRODUCE OR OTHER PRODUCTS AND
Filed March 14, 1966　　APPARATUS FOR PERFORMING THE METHOD
　　　　　　　　　　　　　　　　　　　　　　　8 Sheets-Sheet 4
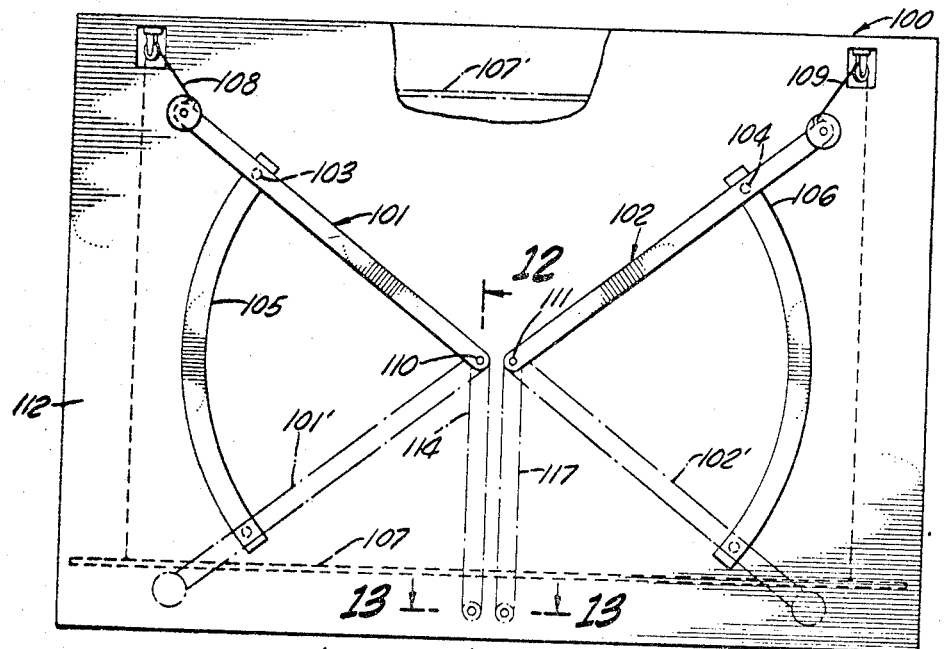
FIG. 11.
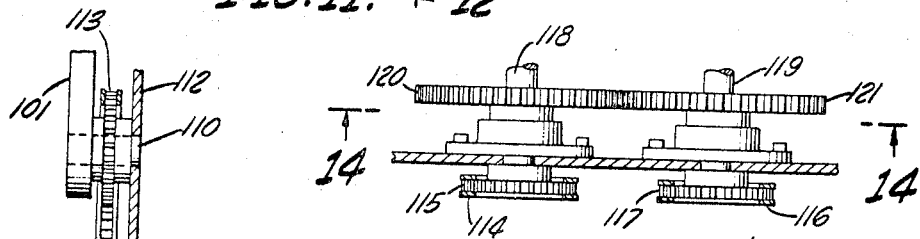
FIG. 13.
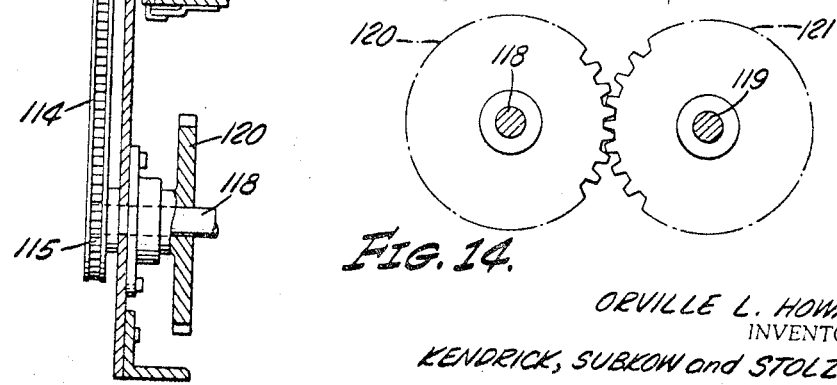
FIG. 12.
FIG. 14.
ORVILLE L. HOWARD
INVENTOR.
KENDRICK, SUBKOW and STOLZY
BY
ATTORNEYS

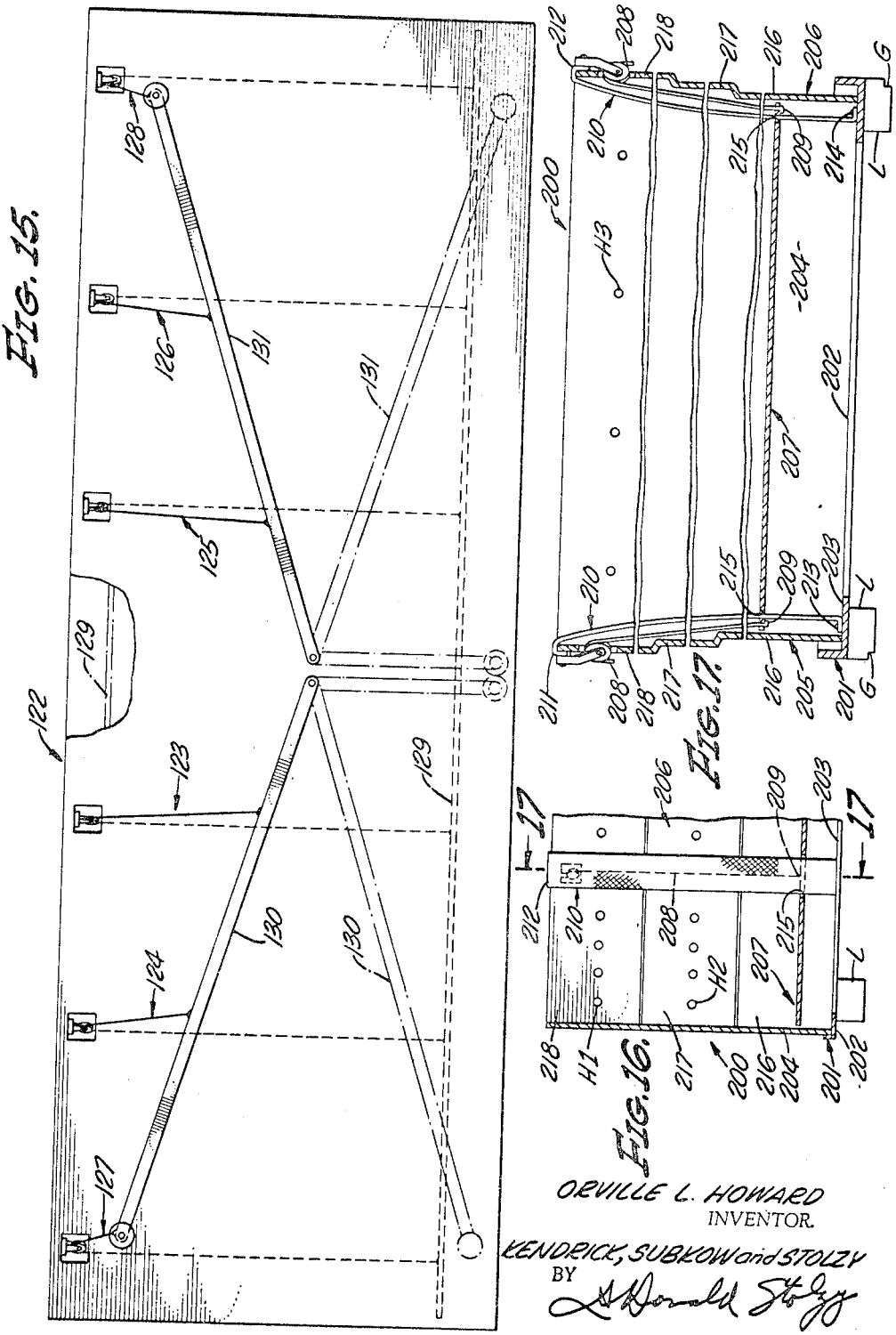

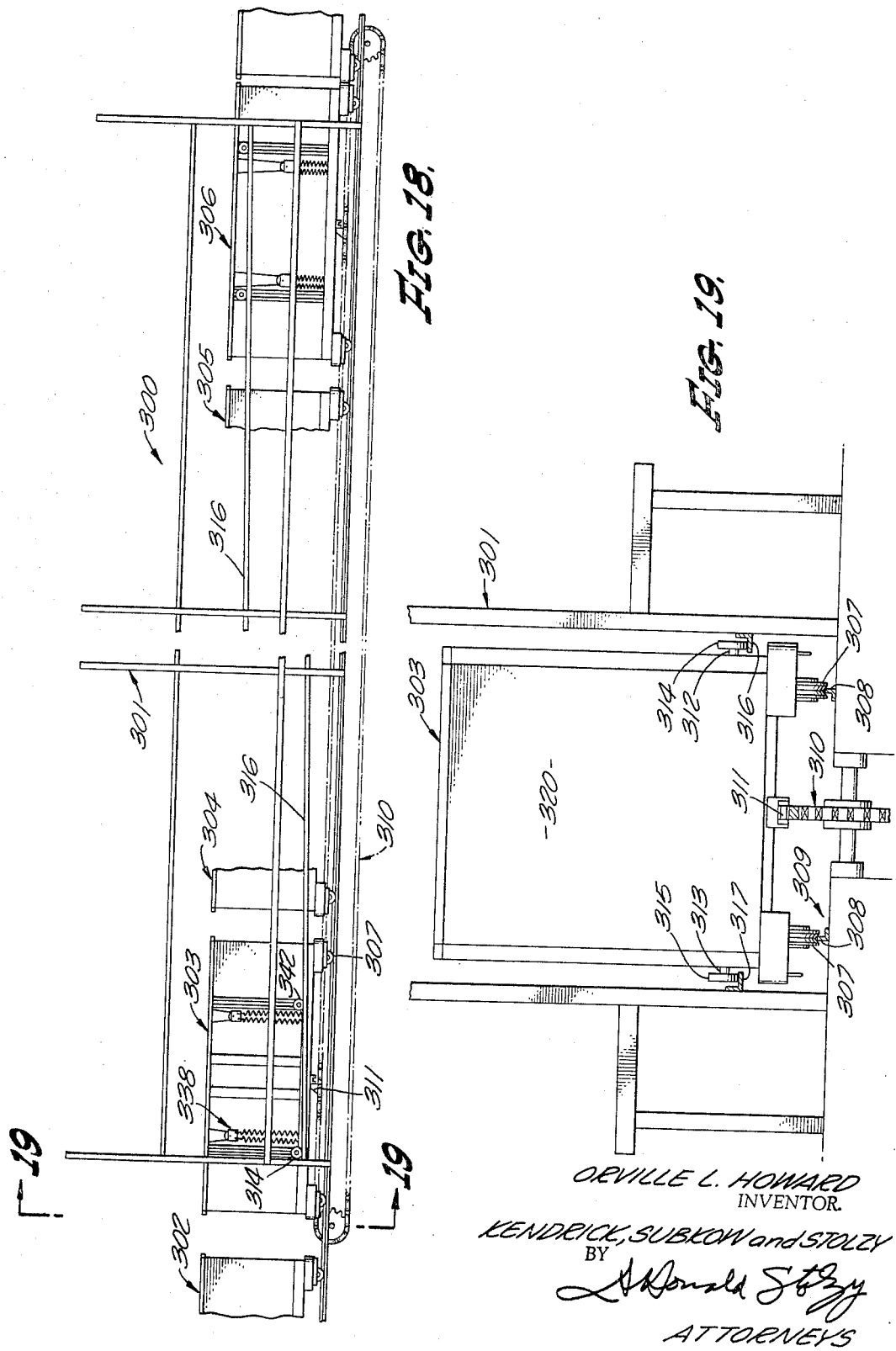

Jan. 6, 1970     O. L. HOWARD     3,487,605
METHOD OF HANDLING PRODUCE OR OTHER PRODUCTS AND
APPARATUS FOR PERFORMING THE METHOD
Filed March 14, 1966     8 Sheets-Sheet 7
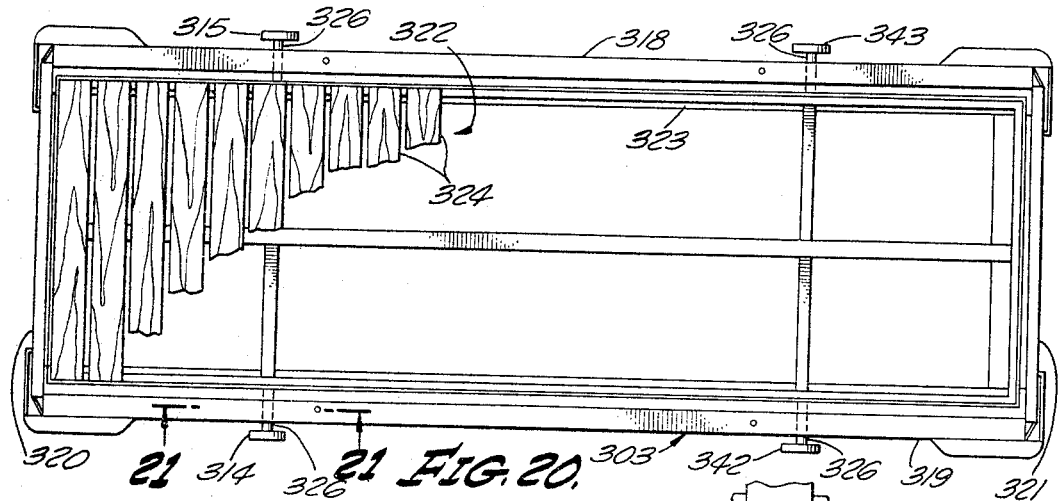
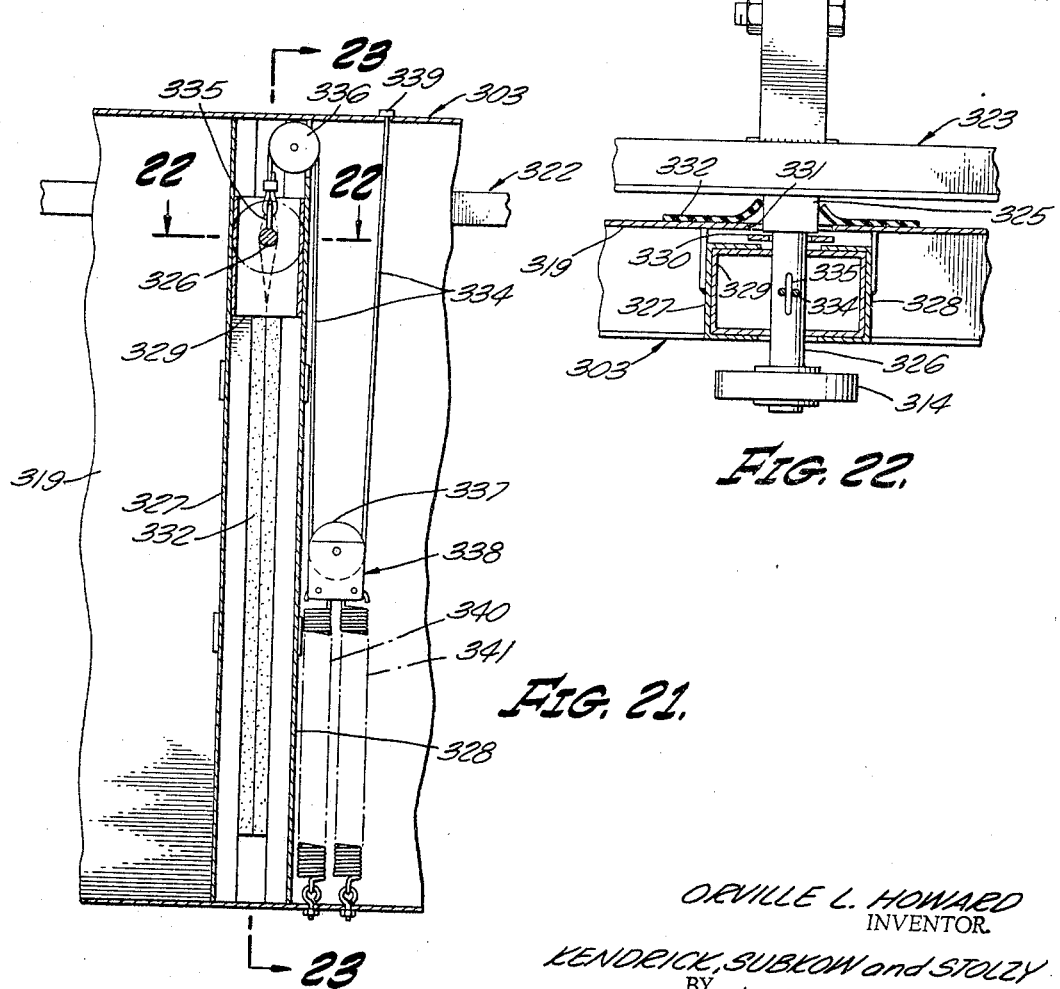
ORVILLE L. HOWARD
INVENTOR.
KENDRICK, SUBKOW and STOLZY
BY
ATTORNEYS Jan. 6, 1970     O. L. HOWARD     3,487,605
METHOD OF HANDLING PRODUCE OR OTHER PRODUCTS AND
APPARATUS FOR PERFORMING THE METHOD
Filed March 14, 1966     8 Sheets-Sheet 8

ORVILLE L. HOWARD
INVENTOR.

KENDRICK, SUBKOW and STOLZY
BY
ATTORNEYS

United States Patent Office 3,487,605
Patented Jan. 6, 1970

3,487,605
METHOD OF HANDLING PRODUCE OR OTHER PRODUCTS AND APPARATUS FOR PERFORMING THE METHOD
Orville L. Howard, Salinas, Calif., assignor to M-C-T Enterprises, Inc., Salinas, Calif., a corporation of California
Continuation-in-part of application Ser. No. 443,594, Mar. 29, 1965. This application Mar. 14, 1966, Ser. No. 533,995
Int. Cl. B65b 25/04, 43/58, 69/00
U.S. Cl. 53—35    24 Claims

ABSTRACT OF THE DISCLOSURE

The invention relates to a method and apparatus for transporting produce and similar products which are highly susceptible to severe physical damage in handling. The produce is loaded into a storage bin by dropping it from a higher point onto a top layer of the produce at a lower point in the bin, and by changing the height of one of the points to maintain the difference between the heights approximately constant as the bin is filled with more and more produce. The storage bin has a movable bottom panel which is raised to predetermined constant heights as the produce is unloaded to place the produce within easy reach of packing shed workers.

---

This application is a continuation-in-part of copending application Ser. No. 443,594, now abandoned filed Mar. 29, 1965 by the inventor hereof for "Method of Handling Produce or Other Products and Apparatus for Performing the Method." The benefit of the filing date of said copending application is therefore claimed for this application.

This invention relates to the materials handling art, and more particularly to an economical method of and apparatus for carefully transporting produce and similar products which, for example, are highly susceptible to severe physical damage in handling.

The method and apparatus of the present invention may have many applications other than those disclosed herein. Although the present invention is not to be limited to those applications expressly described or illustrated, the invention has been found to be especially useful in the handling of head lettuce, cauliflower, broccoli, celery, peaches, melons, apples, pineapple and green tomatoes.

Although very little has been done in the art of materials handling for the purposes to be described herein, some structures rather remotely related to those of the present invention are disclosed in U.S. Patents Nos. 1,875,585 and 3,080,066; and in French Patents Nos. 1,288,131 and 1,327,167.

Further, it is at present the practice to transport head lettuce for trimming, wrapping, packing and shipment in several ways. It is first harvested by workers in the field. According to one method, it is trimmed and packed in corrugated boxes by these same workers. As soon as a head is harvested, a leaf or two is trimmed from the head. The head is then packed in a box with or without an individual clear plastic wrapper around it. This method requires field workers to have a fairly high trimming skill. That is, one must know how much to trim and how to trim it. Rapid and accurate trimming is an art because leaves of head lettuce hug the head and it is difficult to determine where to make a smooth cut on the butt to trim off the precisely correct number of leaves.

Another method of harvesting utilizes a conveyor fed by workers which only harvest head lettuce and do not pack the lettuce for shipment. The conveyor is pulled across the field at a relatively low rate of speed as the crop is harvested. The conveyor drops the harvested heads into a rather shallow truck having sideboards of only twelve to eighteen inches high. The trucks may be six feet or so wide and six to twelve feet long. These dimensions are of some importance because the lettuce is hauled to a packing shed and dumped some distance onto conveyors called drapes. The lettuce suffers considerable damage both from the dumping and because of the manner in which the packing shed drapes operate. However, a great deal of lettuce damage is dependent upon the size of the said trucks used to haul the lettuce from the field to the packing shed.

Another method of handling head lettuce utilizes approximately rectangular slatted carts, with caster wheels thereon. These carts are called "baskets" and the method of their use is called the "basket method." In this method, the baskets are loaded, five at one time, upon a truck. They are then filled with head lettuce in the field by a conventional field conveyor. The baskets are then trucked to a loading dock and manually rolled onto a packing shed floor to hoists. The hoists are located along a trimming and packing belt conveyor. Each hoist lifts and turns a basket gradually onto its side at waist height. The hoists are hydraulically operated through manually controlled valves.

Other prior produce handling methods involve the use of other specialized equipment. A truck bed may be provided having one removable sideboard and another mounted on rollers. The one mounted on rollers is moved to push a load of lettuce off of the bottom of the truck bed.

Another method utilizes a truck having a builtin drape conveyor. This truck may be manually unloaded or its load may be dumped into a trough as before.

From the foregoing, it will be appreciated that lettuce may be packed in the field with less damage than it can be packed in a shed. It is well known that more efficient trimming and wrapping can be done by women than by men. This is due to the fact that women, in general, have a manual dexterity superior to that which men have. However, women do not have the strength or endurance required for harvesting. The shed packing method thus is better than the field packing method in that the labor of women can be used. The shed packing method might also be superior to the field packing method in all respects were it possible to eliminate the damage to which the leaves of heads of lettuce are subjected during handling. Some of the causes of this problem may be understood from the following detailed description of how lettuce is dumped from the above-mentioned trucks to the conveyors or drapes.

In the first place, the bed of each lettuce hauling truck is pivoted at a lower side edge. The sideboard of that same side is also pivoted to open downwardly. When it is desired to unload a truck onto the drapes, the sideboard is lowered and the entire bed is inclined toward the drapes by the use of a hoist. The bed may be inclined at an angle of up to about forty-five degrees before the lettuce begins to slide off of the truck bed. After it begins to slide, it accelerates rapidly and the entire load of lettuce is dumped onto the drapes with a quick crunching motion. This results in lettuce damage for three reasons. The sliding contact that the lettuce makes with the truck bed as it is dumped off of the bed bruises and abrades the lettuce. The impact of the lettuce initially falling upon the drapes causes lettuce leaves to be broken and bruised. Further, the impact of a principal portion of the load crushes the lettuce heads closest to the drapes.

The drapes generally consist of spaced, parallel wooden shafts connected at their ends by belts. They form an endless conveyor similar to but wider than the lettuce field conveyor. The drapes are driven by an electric motor which is operated as needed to dump a large load of lettuce into a trough from which it is manually retrieved, trimmed and packed. The dumping action of the drapes into the trough also increases lettuce damage.

As will be evident, the lettuce hauling trucks have shallow beds because the field conveyor is located at a constant height. Thus, if a truck bed were deep and located far below the field conveyor, lettuce heads falling such a great distance initially onto such a deep empty truck bed would become crushed and damaged beyond salvage.

In order to be reasonably economical and efficient of time and equipment, it is necessary to have each truck haul a load of a reasonable size. This requires a wide load. However, the lettuce damage increases with the load width because the center of mass of the sliding load which is dumped from the truck bed increases in height with load width. This takes place because the load fails to begin to slide until a truck bed is inclined at an angle of almost forty-five degrees.

The wide prior art truck beds make the drapes necessary because the truck beds are too high off of the packing shed floor and too wide to unload manually.

In addition to the damage problem, it is also disadvantageous that the packing shed must be relatively large because the lettuce hauling trucks must be driven through it. The drapes must also be very large.

It is a disadvantage of the drape methods that trimmers must tug and pull lettuce from the trough into which the lettuce is dumped. This damages the lettuce.

The basket method has several serious disadvantages. In the first place the baskets are deep and have a series of fixed bottom wall slats or the like. The conventional field conveyor is thus disposed a substantial distance from the bottom of a basket. Thus, head lettuce initially falling into an otherwise empty basket regularly becomes bruised and crushed, due to the fact that the distance of the fall of the lettuce from the conveyor to the bottom of the basket is great and the impact of a lettuce head thereon is thereby large. Further, this problem is magnified because conventional conveyors are designed both for trucks off of which lettuce is dumped and for loading baskets. This means that such conveyors are really located at a greater height above a trailer floor than would be required if such a conveyor were made especially for the trailer method.

The basket method is also disadvantageous because trimmers and packers must stand idle while baskets are being loaded and unloaded from the hoists. Further, at least some workers must also stand idle while the hoist valve is periodically operated manually to tip over a basket further and further from time to time.

It is also a disadvantage of the basket method that a large shed space is required to receive the baskets as they are unloaded from trucks, and to store empty baskets until they are hauled away. Further, substantial space is required for the hoists and for the manual loading and unloading of them.

From the foregoing, it will be appreciated that the use of the present invention is advantageous over that of the basket method because of the yieldingly supported bottom panel of the present invention which protects head lettuce or other products from a long damaging fall into a deep storage bin.

It is a disadvantage of all of the drape methods and also the basket method that trimmers must stand idle and time must be wasted while a fresh supply of lettuce is repositioned within reach either by operation of the drapes or by operation of the basket hoists.

In accordance with the present invention, the above-described and other disadvantages of the prior art are overcome in shed packing head lettuce by making negligible the crushing action created by a long fall or drop of a lettuce head into a storage bin. However, at the same time, transportation of lettuce is performed both efficiently and economically. Further, abrasion of leaves of head lettuce is also made negligible by minimizing frictional contact of the lettuce with the handling equipment employed to transport the lettuce. The use of unusually large lettuce packing sheds is also made unnecessary.

Lettuce damage is avoided in accordance with the present invention by dropping lettuce from a higher point onto a top layer of lettuce at a lower point in a storage bin, and by changing the height of one of the points to maintain the difference between the heights approximately constant as the bin is filled with more and more lettuce. The distance that the lettuce is allowed to fall is thus always kept to a minimum. Excessive crushing of the lettuce is thereby eliminated by minimizing the impact of the fall.

A storage bin, after it has been filled, is then taken to a packing shed and unloaded. As the bin is unloaded, a bottom panel inside of it which carries the lettuce is raised to place the lettuce within easy reach of the packing shed workers who unload the bin. Easy access to the lettuce from each side of the bin is also provided. The bin can be relatively deep since its bottom panel is movable vertically. Thus, the bin can carry a relatively large and economical load. However, the bin is narrow enough to permit complete manual unloading by workers on each side of it.

In accordance with the present invention, lettuce is removed from the bin, trimmed and placed in corrugated boxes bare or wrapped in a shrunk biaxially oriented polystyrene film or the like as is conventional. The boxes are also conventional and may be stapled closed or secured in any other conventional manner. For example, boxes may be closed by the use of a pressure sensitive adhesive, as is conventional. A considerable number of bins may be employed in several different stages of operation at one time to make the present invention operable continually.

By practicing the present invention, it is possible to avoid lettuce damage because the step of dumping lettuce onto the drapes is entirely eliminated. This is due, in part, to the fact that the bins are narrow enough to be manually unloaded. The load impact crushing damage produced by the prior art dumping step is thus eliminated. It is possible to employ a deep bin for a rather large load because the lettuce load is removed from the bin head by head and is not dumped out all at once to empty the bin. The use of drapes is also eliminated altogether. The damage that the drapes themselves do to lettuce is thus eliminated. No lettuce dumping takes place in the shed. Thus, the lettuce dumping from the drapes to the trough is eliminated.

Notwithstanding the relatively large load that the storage bin of the present invention may carry, abrasion to lettuce leaves is negligible. No leaves are damaged by sliding over the bin bottom panel as they are damaged by sliding over the truck beds of the prior art. Any sliding action on the bin side walls or end walls at the bottom is safe because only a small side load is involved. Further, lettuce at the top of the load suffers no damage at all because this portion of the load does not make any sliding contact even with the bin sidewalls or endwalls.

In accordance with the present invention, all the advantages of the prior art shed pack are retained including its adaptability to the use of the labor of women for trimming and for wrapping. However, a small shed may be employed because the drapes and trucks of the prior art need not be used inside the shed. The drapes are wholly eliminated and the bins may be removed from trucks outside the shed.

In accordance with the present invention, two lines of trimmers may work in a very small shed space, one on each side of the bins. Along this same line, note will be taken that approximately one-half the labor is needed to supply lettuce to the same number of trimmers. The converse is also true because trimmers can stand on both sides of the bins. This doubles the number of trimmers whereas the amount of trucking labor required to supply this increased number of trimmers remains the same.

It is also an outstanding advantage of the present invention that trimmers need not stand idle while head lettuce is unloaded from drapes or baskets, as in the drape and basket methods of the prior art. Lettuce in bins is made available to the trimmers continuously in accordance with the invention.

The above-described and other advantages of the present invention will be better understood from the following description when considered in connection with the accompanying drawings.

In the drawings which are to be regarded as merely illustrative:

FIG. 1 is a side elevational view of apparatus constructed in accordance with the present invention;

FIG. 2 is an end elevational view of the apparatus taken on the line 2—2 shown in FIG. 1;

FIG. 9 is an enlarged side elevational view of a portion of one side of the bin;

FIG. 10 is a transverse sectional view of the bin taken on the line 10—10 shown in FIG. 9;

FIG. 11 is a side elevational view of an alternative embodiment of a bin constructed in accordance with the present invention;

FIG. 12 is a transverse sectional view of a portion of the bin taken on line 12—12 shown in FIG. 11;

FIG. 13 is a longitudinal sectional view of the bin taken on the line 13—13 shown in FIG. 11;

FIG. 14 is a vertical sectional view of a pair of meshed gears taken on the line 14—14 and shown in FIG. 13;

FIG. 15 is a side elevational view of still another alternative embodiment of the bin of the present invention;

FIG. 16 is a longitudinal sectional view through a bin of the present invention having an alternative construction;

FIG. 17 is a transverse section of the bin taken on the line 17—17 shown in FIG. 16;

FIG. 18 is a side elevational view of an alternative embodiment of the present invention;

FIG. 19 is an end elevational view, partly in section, of the embodiment taken on the line 19—19 shown in FIG. 18;

FIG. 20 is a top plan view of a bin employed in the embodiment of FIGS. 18 and 19;

FIG. 21 is a broken away sectional view of the bin taken on the line 21—21 shown in FIG. 20;

FIG. 22 is a sectional view of the bin taken on the line 22—22 shown in FIG. 21;

Figure 3:
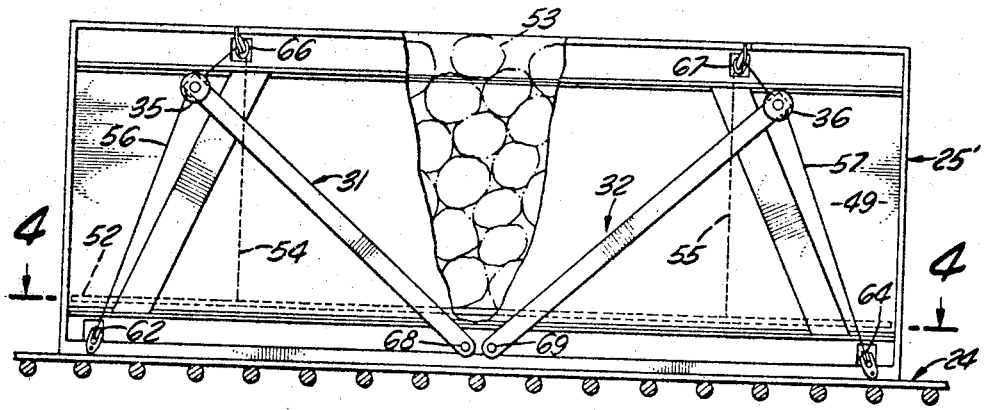
FIG. 3 is an enlarged side elevational view, partially broken away, of a head lettuce storage bin which has a substantially full load of head lettuce therein.

In FIG. 1, apparatus 20 constructed in accordance with the present invention is shown. Apparatus 20 includes a cage or frame 21 which has inverted U-shaped members 22, and a longitudinal stringer 23 fixed to each side thereof. Apparatus 20 also includes a conventional conveyor 24 for head lettuce storage bins 25 that are moved through frame 21 in the direction of arrows 26 and 27. Conveyor 24 may be an endless chain conveyor or otherwise having lugs 28 to urge bins 25 to the right as viewed in FIG. 1.

Apparatus 20 also includes driven conveyor rolls 29 and 30. Conveyor rolls 29 are rotated to move bins 25 at a higher rate of speed thereon in the direction of arrow 26 than conveyor 24 moves bins 25. Similarly, rolls 30 are driven at a rate of speed such that bins 25 are moved away from conveyor 24 in the direction of arrow 27 faster than they move within frame 21.

A detailed description of each of the bins 25 will be made hereinafter. Suffice it to say here that a bin at the left end of conveyor 24 will be full of head lettuce and a bin at the right end thereof will be empty of head lettuce. At the left end of conveyor 24, a bin 25' is shown arms 31 and 32 rotatable along one side thereof about axes 33 and 34, respectively. Arms 31 and 32 carry rollers 35 and 36 rotatably about axes 37 and 38, respectively, thereon.

As shown in FIGS. 9 and 10, roller 35 rolls in a recess 39 in an inverted U-shaped channel 40 which is fixed to frames 22 by a second U-shaped channel 41 welded thereto.

As shown in FIG. 1, channels 40 and 41 are inclined at a very small angle relative to the horizontal. Note will be taken too, that due to the broken view of FIG. 1, channels 40 and 41 on the left hand portion thereof are not in alignment with the representation of these channels on the right hand portion thereof. In actual practice, channel 40 may be inclined at an angle such that its elevation will be lower two and one-half inches within a distance of ten feet.

If desired, the construction of apparatus 20, as shown in FIG. 1, may take pretty much the form shown in the drawing. However, frame 21 may be solid flat pieces of sheet steel fixed to the exterior thereof as indicated at 42 and 43 in FIG. 2. Further, pieces 42 and 43 may have inwardly inclined flanges at 44 and 45, respectively. Framework 21 also may have solid level platforms 46 and 47 fixed thereto, as shown in both FIGS. 1 and 2. Packing shed workers may stand upon the platforms 46 and 47. Pieces 42 and 43 may protect workers on platforms 46 and 47 from the moving machinery and bins 25.

Both sides of bins 25' have arms similar to arms 31 and 32. An arm similar to arm 31 is shown at 31' in FIG. 2. Arm 31' has a roller 35' thereon identical to roller 35. Roller 35' rolls in a channel 40' identical to channel 40.

As shown in FIG. 1, arms 31" and 32" of a bin 25" are positioned downwardly when the bin is unloaded. They are positioned upwardly as shown in bin 25', shown in FIG. 1 when the bin is fully loaded.

As will be explained, head lettuce is loaded into bins 25 by a conventional field conveyor while the bins 25 are loaded on a conventional truck. Loading and unloading of the bins 25 from a conventional truck may be done by a conventional fork truck, if desired.

Figure 4:
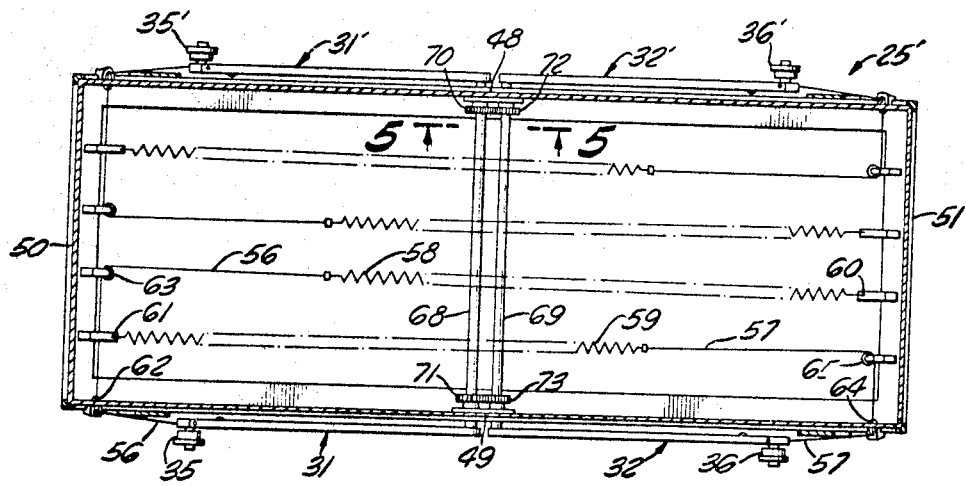
FIG. 4 is a transverse sectional view of the bin taken on the line 4—4 shown in FIG. 3.
Figure 5:
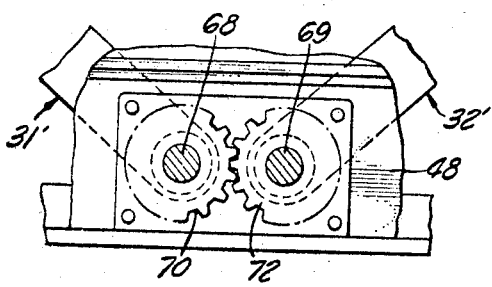
FIG. 5 is an enlarged transverse sectional view of a portion of the apparatus taken on the line 5—5 shown in FIG. 4.

As shown in FIG. 4, bin 25' is rectangular and has two vertical side walls 48 and 49 and two vertical end walls 50 and 51.

As shown in FIG. 3, bin 25' has a rectangular bottom panel 52 which fits inside walls 48, 49, 50 and 51 to support heads of lettuce indicated at 53. Note will be taken that bin 25' shown in FIG. 3 is loaded full of head lettuce 53. Bottom panel 52 is supported by four steel cables, only two, 54 and 55, of which are shown in FIG. 3. Cable 54 is fixed in any conventional way to panel 52 at the edge thereof adjacent wall 49. The same is true of cable 55. Cables 54 and 55 are also fixed by any conventional means to the outer ends of arms 31 and 32, respectively. Cables 56 and 57 are also fixed to the outer ends of arms 31 and 32, springs 58 and 59, respectively, shown in FIG. 4. Spring 58 is connected at 60 to end wall 51. Spring 58 is connected at 60 to end wall 51. Spring 59 is connected at 61 to end wall 50. Cable 56 is threaded around conventional pulleys 62 and 63. Cable 57 is threaded around conventional pulleys 64 and 65. The upper half of the bin 25′ shown in FIG. 4 is identical to the lower half and the upper half therefore will not be described in detail. By the "upper half," what is meant is all of the structure on the side thereof including side wall 48 separated from the other half of bin 25 by a longitudinal plane therethrough bisecting end walls 50 and 51.

As shown in FIG. 3, cable 54 is threaded over a conventional pulley 66. Cable 55 is similarly threaded over a conventional pulley 67. Note will be taken that pulleys 66 and 67 are located in approximately vertical planes. These planes are at an angle and are not parallel to the planes of side walls 48 and 49. Further, pulleys 66 and 67 are located in planes approximately perpendicular to the plane of bottom panel 52 shown in FIG. 3.

Pulleys 62 and 64 are located in planes approximately perpendicular to side walls 48 and 49. However, pulleys 63 and 64 are located in planes which are not parallel to end walls 50 and 51. The axes of pulleys 63 and 65 may be perpendicular to the bottom panel 52 in the position it is shown in FIG. 3, if desired.

As stated previously, it is desirable to keep bottom panel 52 approximately level at all times because lettuce 53 could otherwise become wedged between an edge of panel 52 and any of the side or end walls 48, 49, 50 and 51. For this reason, bin 25′ is provided not only with arms 31, 32 and 31′, but also with an arm 32′. Arms 31 and 31′ are fixed to a shaft 68. Arms 32 and 32′ are fixed to a shaft 69. Shaft 68 has gears 70 and 71 fixed thereto. Shaft 69 has gears 72 and 73 fixed thereto. Gears 70 and 72 are meshed. Gears 71 and 73 are also meshed.

Figure 6:
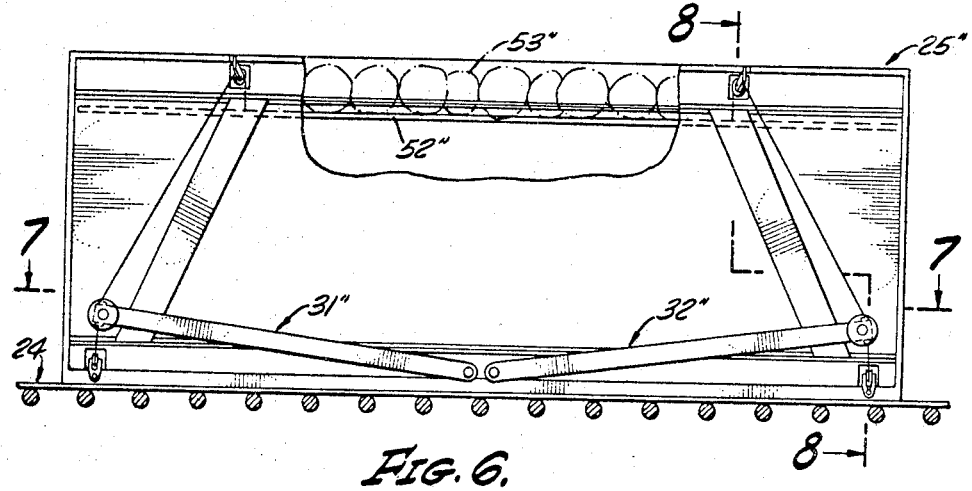
FIG. 6 is a side elevational view, partly broken away, similar to FIG. 3 of a head lettuce storage bin only partially loaded.
Figure 7:
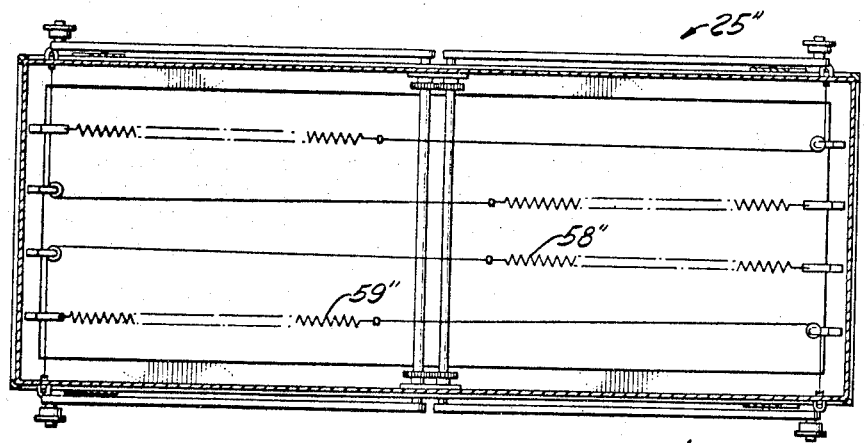
FIG. 7 is a transverse sectional view of a nearly unloaded bin taken on the line 7—7 shown in FIG. 6.

The relative positions of the parts of bins 25″ are shown in FIG. 6, wherein bottom panel 52″ thereof identical to bottom panel 52 is at an uppermost position. Note will be taken that springs 58″ shown in FIG. 7, and spring 59″ also shown therein, are not extended nearly so far as springs 58 and 59 are extended in FIG. 4.

Figure 8:
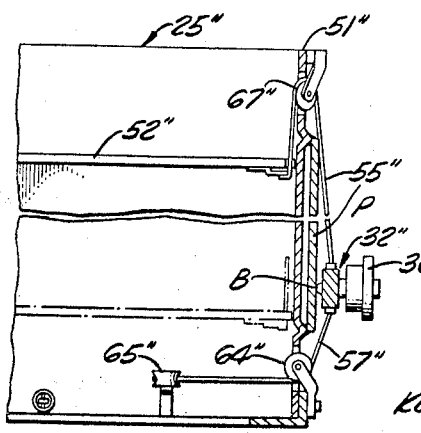
FIG. 8 is an enlarged transverse and broken sectional view of a portion of the bin taken on the line 8—8 shown in FIG. 6.

As shown in FIG. 8, pulleys 67″, 64″ and 65″ are rotatable about their symmetrical axes, but are otherwise fixed relative to the wall 51″ of bin 25″, like reference numerals being used for like parts with prime marks added in FIG. 8.

Note will be taken also from FIG. 8 that cables 57″ and 55″ are inclined slightly outwardly away from end wall 51″ of bin 25″ to hold arm 32″ thereagainst. Further, end wall 51″ has a wear plate P fixed thereto. Similar wear plates are fixed to all bins 25 at the position of each arm thereon. A ball bearing in arm 32″ at B is also provided to bear against wear plate P. A similar wear plate and ball bearing P′ and B′, respectively, are shown in FIG. 10.

As shown in FIG. 9 and FIG. 10, arm 31 has a shaft S fixed thereto with a boss A against which roller 35 rotates. Roller 35 is held onto shaft S against boss A by a conventional snap ring R.

In FIG. 11, a bin 100 is provided having arms at 101 and 102 that have bars 103 and 104 respectively to bear against arcuate plates 105 and 106, respectively.

Arms 101 and 102 are biased downwardly by cables and springs, not shown, identical to those shown in FIGS 1 to 10, inclusive. Arms 101 and 102 support a bottom panel 107 by cables 108 and 109, respectively.

A pair of arms identical to arms 101 and 102 are provided on the opposite sides of bin 100. For this reason, all four arms will not be described in detail. Further, arms 101 and 102 are also identical. All of the structural details of each will therefore not be described. Only some detail of the construction of both arms 101 and 102 will be described.

The operation of bin 100 is very similar to the operation of the bins shown in FIGS. 1 to 10. The principle difference is that arms 101 and 102 are pivotally mounted on stub shafts 110 and 111 respectively, fixed to bin side walls 112. Note will be taken that shafts 110 and 111 are fixed to side walls 112 near the center thereof.

Each arm has a sprocket fixed thereto. For example, arm 101 has a sprocket 113 fixed thereto. Sprocket 113 carries a chain 114 that goes around a second sprocket 115 shown in FIG. 3. Arm 102 has a similarly associated chain 116 as shown in FIG. 13. Arm 102 also has a sprocket 117 associated therewith similar to sprocket 115. Sprockets 115 and 117 are fixed to shafts 118 and 119, respectively, and serve the same purpose as shafts 68 and 69 shown in FIGS. 3 and 4. Meshed gears 120 and 121 are also respectively fixed to shafts 118 and 119 to serve the same purpose as gears 71 and 73 do as shown in FIG. 4.

In the operation of the bin 100, when arms 101 and 102 move to dotted line positions shown at 101′ and 102′, respectively, chains 114 and 116 move to keep arms 101 and 102 moving together through gears 120 and 121 to keep arms on the opposite side of bin 100 also moving at the same time through shafts 118 and 119.

As before, note will be taken that arms 101 and 102 take the solid line positions shown in FIG. 11 when bin 100 is fully loaded. When bin 100 is unloaded, bottom panel 107 takes a position shown at 107′.

As shown in FIG. 15, a bin 122 may be provided much longer than bin 100. For example, bin 100 may be made in the proportions shown with a 10 foot length. The same is true of bin 122, except that bin 122 may be of a 20 foot length. Bin 122 may be identical to bin 100 except for the difference in lengths, and for the addition of cable and pulley systems 123, 124, 125 and 126.

The regular cable and pulley systems 127 and 128 may also be provided. All of the systems 123 to 128 may be employed to lift bottom panel 129.

Bin 122 has arms 130 and 131. Arms 130 and 131, and the arms of bin 122 on the opposite side thereof are biased downwardly by cables and springs of a type identical to those shown in FIGS. 1 to 10. In particular, only one such cable and spring are employed for each arm on bin 122. These single cables are to be distinguished from the multiple cables of assemblies 123 to 128. Note will be taken that the cables of assemblies 123 to 128 are all taut only when bottom panel 129 is in its lowermost and fully loaded position. The cables of assemblies 123, 124, 125 and 126 are slack when panel 129 is in its uppermost position as indicated at 129′.

An alternative embodiment of the present invention is indicated at 200 in FIG. 16. This embodiment may be identical to any one of those shown in FIGS. 1 to 16, inclusive, with the exception of the following modifications which are specifically shown and described herein. In particular, bin 200 has a rectangular angle iron base frame 201 having end pieces 202 and side pieces 203. Frame 201 carries end walls 204 and side walls 205 and 206. Side walls 205 and 206 are identical. Both end walls 204 are also identical.

Bin 200 has a horizontal bottom panel 207 movable vertically within walls 204, 205 and 206. Panel 207 is supported by four steel cables 208 as before. Cables 208 are fixed to panel 207 at side edges thereof at 209 as shown in FIG. 17.

Flexible fabric belts 210 cover each cable 208. Each belt is fixed at the upper edges of walls 205 and 206 at 211 and 212. They are also fixed to angle irons 203 at 213 and 214. As shown in both FIGS. 16 and 17, a longitudinal rectangular slot is provided through panel 207 for each belt 210. Each belt 210 is in fact threaded through each corresponding slot 215. Also, as shown in both FIGS. 16 and 17, belts 210 are disposed at the positions 209 at which cables 208 are connected to bottom panel 207.

Bin 200 is also different in construction from the bins of FIGS. 1 to 15 in that side walls 205 and 206 have lower intermediate and upper sections 216, 217 and 218. Lower sections 216 are spaced apart a distance smaller than the distance intermediate sections 217 are spaced apart. Further, upper sections 218 are spaced apart a distance greater than the distance intermediate sections 217 are spaced apart.

It is to be understood, that in accordance with the present invention, bottom panels 52 and 52" may be solid, as shown, or constructed to support lettuce or any other suitable product or device by grating bars, perforate or solid sheet aluminum or steel or otherwise.

Sidewalls 205 and 206 of bin 200 shown in FIGS. 16 and 17 may be described or referred to herein as flared or tapered because of the gradually increased spacings of sidewall sections 216, 217 and 218.

As shown in FIGS. 16 and 17, vent holes H1, H2 and H3 may be provided in the side and end wall of bin 200 to retard oxidation of lettuce therein.

Bin 200 is provided with leg L to hold the bin off of the floor. Legs L have recesses G so that bins, such as bin 200 may be stacked two high and hauled more economically over distances of, for example, fifty miles or so. One bin would then nest slightly in the other because of recesses. Legs L are also needed to hold the stacked bins apart so that the forks of a fork truck can be inserted in between bins for loading one bin onto another or for unloading one from another. Further, the legs L support bin 200 off of the floor so that bin 200 may be picked up from or lowered to a position on the floor.

As a practical matter, bins 25 may be constructed in the proportions shown in the drawings. They may be six, eight, ten or twenty feet long. They may carry a lettuce load of from 1800 pounds to 2200 pounds. All the springs illustrated in the drawings may be 70 pound springs having a stressed extended length of 72 inches. Heavier springs may be required for ten and twenty foot bins.

For stable guiding action of bin rollers 35, 36, 35' and 36' shown in FIG. 4 within channels 40 and 40', it may be desired that there should be some play in gears 70, 72, 71 and 73. This is due to the fact that channels 40 and 41' are inclined slightly, as stated previously.

Although only one specific embodiment of the invention has been illustrated and described, it will be appreciated that the parts of the invention may be transposed without departing from the invention. Further, the claims appended hereto may be entitled to a reasonable range of equivalents including, but not limited to, the use of level channels 40 and 41' with an inclined conveyor 24. Further, the use of channels 40 and 40' and the equipment of bins 25 associated therewith may also be eliminated, provided that special means with or without springs are provided to raise the bottom panels of the bins such as bottom panels 52 and 52".

All bearings similar to bearing B may be eliminated if pulleys corresponding to pulleys 64" and 67" shown in FIG. 8 are aligned accurately. No plate P shown therein would then be necessary.

The phrase "meshed gear means" is hereby defined for use herein as meshed gears, chains and sprockets or any other means equivalent thereto.

Although all the springs shown in the drawings including springs 58, 59, 58" and 59" may be conventional, helically coiled springs, any kind of springs, counter weights, pneumatic or hydraulic or similar devices, or energy absorptive devices may be substituted for or used in lieu of said springs.

The phrase "vertical wall enclosure means" is hereby defined for use herein as meaning any vertical wall enclosure means including but not limited to side walls 48 and 49 and end walls 50 and 51. Further, the word "vertical" int he phrase "vertical wall enclosure means" as used herein shall mean an approximately vertical structure and not a precisely vertical structure.

Also as described herein, the springs 58, 59, 58" and 59" are located approximately in a horizontal plane. However, to prevent physical interference they need not be located in exactly the same horizontal plane. Further, any two springs need not be located in exactly the same horizontal plane. In other words, some degree of vertical spacing can obviously be employed without departing from the true scope of the invention. Further, the springs may be inclined, if desired.

Hereinbefore and hereinafter, walls 48, 49, 50 and 51 have been and will be referred to as end walls and side walls. However, it is to be understood that the phrase "end walls" may be substituted for the phrase "side walls," and vice versa. Further, it is obvious that a square bin 25 might be employed, although, in accordance with a special feature of the present invention, the bins 25 are only a few feet wide so that they may be completely empty by packing shed workers located on platforms 46 and 47 on opposite sides of bins 25. That is, the width of bins 25 is not critical to some broad features of the present invention, but according to some certain specification features, bins 25 may conveniently be fairly long in comparison to their width.

Shafts 68 and 69 will hereinafter be referred to as horizontal. However, it is to be understood that these shafts may be approximately horizontal and need not be exactly horizontal. Further, an entirely separate structure might be used in lieu thereof.

In describing the locations of structures relative to the arms 31, 32, etc., the "ends" of the arms will be referred to. However, it is to be noted that the effective "ends" thereof are to be referred to. The effective "ends" are simply positions along the ends of the arms spaced from each other.

The phrase "gear means" shall be used herein to mean gears, chains and sprockets or otherwise.

As will be evident, in accordance with one feature of the method of the present invention, lettuce is dropped from an approximately constant height from a conventional field conveyor onto bins 25 onto bottom panels 52 therein. However, what is meant by an approximately constant height is that the elevation of the field conveyor is not changed during loading operations.

From time to time herein, gears 70, 72, 71 and 73 will be referred to as the ends of corresponding shafts 68 and 69. However, it is obvious that these gears are simply spaced along the lengths of shafts 68 and 69. For this reason, the "ends" of shafts 68 and 69 so referred to are the effective ends thereof, where the corresponding gears are located.

Also, for the purpose of definition, the word "members" is used herein to describe arms 31, 32, etc.

If desired, the interior of side and end walls 48, 49, 50 and 51 might be coated or otherwise provided with a friction free surface. Alternatively, a polyethylene bag of the size of a bin 25 might be located therein or hung inside thereof, or otherwise provided therein.

As stated previously, the apparatus 20 of the present invention may be employed for many purposes. For this reason, the word "lettuce" herein shall mean any food or other product which the apparatus 20 of the present invention can handle.

From the foregoing, it will be appreciated that the apparatus of the invention may be employed inside a conventional packing shed. Bins 25 may be unloaded from conventional trucks by conventional fork trucks. Hence, no lettuce is dumped after it is placed in bins 25. Loading of lettuce 53 into bin 25' is performed without crushing the lettuce. Bottom panel 52 lowers gradually therein as the weight thereon increases. This keeps the top layer of lettuce 53 therein always approximately the same distance from the field conveyor which loads the bin. Abrasion of lettuce leaves is also made negligible by eliminating all frictional contact of lettuce 53 with bin 25', except the lower heads 53 which may rub slightly against side walls 48 and 49 of bin 25' as that bin is loaded and unloaded.

Note will also be taken that the use of the present invention is advantageous over the use of the basket method of the prior art because of the lowerable bottom panels 52, 52″, 107, 129 and 207.

The use of large lettuce packing sheds is also made unnecessary, because bins 25 may be unloaded externally of the shed and placed on conveyor 24 at one end thereof. No space need be provided for dumping.

Easy access to lettuce from each side of each bin 25 is made, in that the action of channels 40 and 41′ upon arms 31, 32, etc., raise corresponding bottom panels 52 in bins 25 as they are supported on conveyor 24.

In accordance with the foregoing, it will be appreciated that the use of drapes is eliminated in that no lettuce dumping is done in the shed or at the shed. The damage done to head lettuce by the drapes is thus also eliminated. No dumping trough is employed.

In accordance with the present invention, all the advantages of the prior art shed packing are retained, including its adaptability to the use of the labor of women for trimming and for wrapping.

In FIG. 18, an arrangement 300 is shown similar to apparatus 20 shown in FIG. 1. Arrangement 300 includes a framework 301 through which a series of bins 302, 303, 304, 305 and 306 are serially supported.

As shown in FIG. 19, bin 303 has four V-shaped wheels 307 which ride upon L-shaped angle irons 308 that act as rails of a track 309. Bin 303 is supported on track 309 by a chain conveyor 310 that has a lug 311 to fit behind bin 303 and urge it to the right as viewed in FIG. 18, as before.

As will be explained, bin 303 has a bottom panel which is movable vertically as before. As shown in FIG. 19, shafts 312 and 313 are connected directly to the bottom panel. Rollers 314 and 315 are rotatable on shafts 312 and 313, respectively. The bottom panel is lifted by L-shaped angle irons 316 and 317 as bin 303 is transported to the right, as viewed in FIG. 18 by chain conveyor 310. Angle irons 316 and 317 actually act as rails. Note will be taken that rails 316 and 317 lift the bottom panel in bin 303 as it is transported to the right as viewed in FIG. 18. Although rails 316 and 317 perform a function similar to rails 40 and 40′ shown in FIG. 2, note will be taken that rails 316 and 317 extend upwardly to the right from conveyor 310 as viewed in FIG. 18, whereas rails 40 and 40′ extend downwardly to the right as viewed in FIG. 1.

As shown in FIG. 20, bin 303 has two side walls 318 and 319, and two end walls 320 and 321. As before, bin 303 has no top cover. However, it has a bottom panel 322. Bottom panel 322 includes a rectangular frame 323 made of L-shaped angle irons. A series of spaced wooden slats 324 are then fixed within frame 323.

A piece of square stock 325 is fixed to frame 323 at four locations, two on each side. A shaft 326 is fixed to each piece 325. A roller is then rotatable on each shaft. Roller 314 is so illustrated in FIG. 25.

As shown in FIG. 22, each shaft 326 has a pair of U-shaped channels 327 and 328 fixed to a side wall such as sidewall 319 to fit around a rectangular follower 329. Follower 329 guides movement of shaft 326 upwardly and downwardly between channels 327 and 328. However, note will be taken that in the embodiment shown in FIGS. 18 to 25, inclusive, no equalizing means are provided for bottom panel 322. That is, bottom panel 322 may tilt from side to side and from end to end. Furthermore, the use of a follower 329 for each shaft 326 is also unnecessary. It has been found in practice that bottom panel 322 may bind in a tilted position. However, when lettuce is dumped onto bottom panel 322 at the end or side which is uppermost, the bottom panel 322 easily rights itself.

In connection with guiding action of bin 303 on shafts 326, note will be taken that the ends of channels 327 and 328 may be spaced apart a distance a great deal larger than the diameter of shaft 326. Shaft 326 may therefore move a considerable distance laterally between channels 327 and 328.

An annular washer 330 prevents bottom panel 322 from tilting laterally beyond a predetermined amount. However, washer 330 fits loosely around shaft 326 between channels 327 and 328 and the end of square stock 325. Some leeway therefore is permitted in the horizontal movement of bottom panel 322 within bin 303.

Side wall 319 of bin 303 has a slot 331 therethrough which is substantially wider than the diagonal dimension of square stock 325. Square stock 325 thus does not become bound in slot 331.

Figures 23, 24, 25:
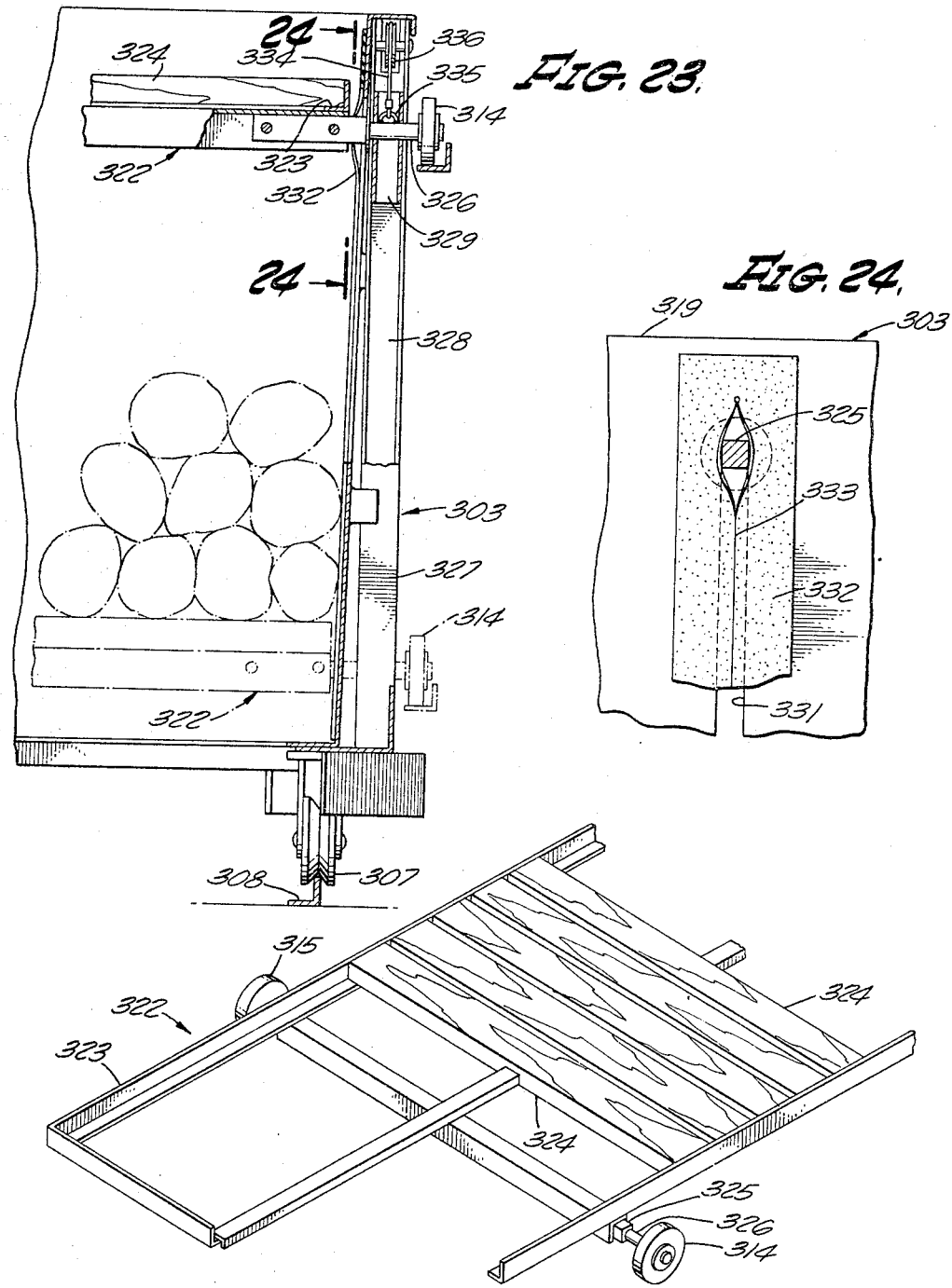
FIG. 23 is a transverse sectional view of the bin taken on the line 23—23 shown in FIG. 21.
FIG. 24 is an inside elevational view of a portion of the bin shown in FIGS. 18 to 23, inclusive.
FIG. 25 is a perspective view of a bottom panel employed in the bin shown in FIGS. 19 to 24, inclusive.

As shown in FIG. 24, a strip of belting or rubber-like material 332 is cemented to the inside of side wall 319 over slot 331. Strip 332 is slit at 333 to allow square stock 325 to project therethrough to bottom panel 322.

As shown in FIG. 21, shaft 326 is supported by a cable 334. Cable 334 is secured to shaft 326 at a U-shaped eye 335 fixed thereto as shown in FIGS. 21, 22 and 23.

Cable 334 extends over a sheave 336 rotatable on bin 303. Cable 334 then extends around a sheave 337 rotatable on a pulley 338. Cable 334 then is fixed to bin 303 at 339. Springs at 340 and 341 are fixed between bin 303 and pulley 338.

As shown in FIG. 20, rollers 342 and 343 are rotatably mounted on corresponding ones of shafts 326 as well as rollers 314 and 315. The structure in the vicinity of rollers 315, 342 and 343 are identical to the structures shown in the vicinity of rollers 314 in FIGS. 21 to 25, inclusive.

Although only a few embodiments of the present invention have been described and illustrated herein, many changes and modifications will of course suggest themselves to those skilled in the art. The present invention should therefore not be limited to the embodiments selected for this disclosure, the true scope of the invention being defined only in the appended claims.

What is claimed is:

1. Materials handling apparatus comprising: a storage bin, said bin including vertical wall enclosure means and a substantially horizontal bottom panel movable vertically inside said enclosure means; a roadbed for said bin; means for moving said bin along on said roadbed in a predetermined direction; and means for raising said panel as said bin is moved along on said roadbed.

2. The invention as defined in claim 1, wherein said last named means includes elevator means responsive to movement of said bin along said roadbed for raising said panel in accordance with said movement.

3. The invention as defined in claim 2, wherein said elevator means includes follower means outside of said enclosure means connected with said bin bottom panel, and a rail on each side of said enclosure means to move said follower means in a vertical plane.

4. The invention as defined in claim 3, wherein said follower means includes a plurality of rollers, and wherein said rails bear against said rollers.

5. The invention as defined in claim 4, wherein said follower means includes a sheave for each roller at the top of said enclosure means, said follower means also including a device movably mounted on the outside of said enclosure means to carry each roller, said follower means also including a cable for each said device, each said cable having one end fixed to said panel, each cable extending over a corresponding sheave, each cable also being fixed to a corresponding one of said devices.

6. The invention as defined in claim 5, wherein said enclosure means and said bin bottom panel are rectangular, two of said cables being fixed to each side of said panel, all of said cables being fixed to said panel in symmetrical positions, each of said rails having a construction to fit under the rollers on a corresponding side of said bin, said roadbed and said rails being inclined at an acute angle relative to each other in a vertical plane, said roadbed and said rails converging toward each other in a direction opposite said predetermined direction, said elevator means including spring-like means to urge said panel upwardly in said enclosure means.

7. The invention as defined in claim 4, wherein said follower means includes a slot through said enclosure means for each roller and a shaft fixed to said panel extending through each slot, one of said rollers being rotatably mounted on each of said shafts.

8. The invention as defined in claim 7, wherein said enclosure means and said bin bottom panel are rectangular, two of said shafts being fixed to each side of said bottom panel, all of said shafts being fixed to said panel in symmetrical positions, each of said rails having a construction to fit under the rollers on a corresponding side of said bin, said roadbed and said rails being inclined at an angle relative to each other in a vertical plane, said roadbed and said rails diverging from each other in said predetermined direction, said elevator means including spring-like means to urge said panel upwardly in said enclosure means.

9. Materials handling apparatus comprising: a temporary storage bin having vertical wall enclosure means and a substantially horizontal bottom panel, said panel being movable vertically within said enclosure means, said enclosure means having vertical slots therein; a plurality of shafts fixed to said panel extending through said slots; a roller rotatably mounted on the end of each of said shafts; at least one helically coiled tension spring for each shaft, each spring having one end fixed to said enclosure means near the bottom thereof; a first sheave fixed to the other end of each of said springs; a second sheave fixed to said enclosure means at the top of each slot; a cable for each spring, each cable having one end fixed to said enclosure means near the top thereof, each cable extending around corresponding first and second sheaves, the other end of each cable being fixed to a corresponding shaft; a roadbed for said bin to ride upon; a rail on each side of said roadbed to fit under a pair of corresponding rollers; and means to transport said bin in a predetermined direction along on said roadbed between said rails, said roadbed and said rails being disposed at an acute angle with respect to each other, said roadbed and said rails diverging vertically away from each other in said predetermined direction.

10. Materials handling apparatus comprising: a bin including vertical enclosure means and a substantially horizontal bottom panel movable vertically within said enclosure means; projection means outside said enclosure means movable as said panel is moved, said projection means including a roller mounted to rotate about a substantially horizontal axis on each side of said enclosure means; a track; a set of wheels on said bin to fit said track; means to allow said panel to lower inside said enclosure means; a pair of parallel rails, each of said rails being mounted in a vertical plane parallel to said track, said rails being downwardly convergent toward the plane of said track in a predetermined direction therealong; and means to transport said bin a direction opposite said predetermined direction along said track, said rails being positioned to engage said rollers to lift said panel as said bin is positioned to engage said rollers to lift said panel as said bin is transported in said opposite direction along said track.

11. Materials handling apparatus comprising: a rectangular bin having parallel side and end walls, each of said side walls having two parallel vertical slots therethrough, all of said slots being symmetrically disposed through said bin side walls, said bin also including a substantially horizontal bottom panel movable vertically within said walls; a shaft for each slot, each shaft being fixed to said panel in a position projecting through each corresponding slot; and support means to suspend each shaft resiliently from said side walls outside of said bin.

12. The invention as defined in claim 11, wherein said support means includes a pair of first sheaves for each pair of shafts at the top of each corresponding side wall, a pair of springs for each pair of shafts having one end fixed to the bottom of a corresponding side wall, a second sheave fixed to the other end of each of said springs, a cable for each shaft, each of said cables having one end fixed to a corresponding shaft, each cable also extending around a corresponding first and second sheave, the other end of each cable being fixed to a corresponding side wall.

13. Apparatus for transporting head lettuce from a field to a packing shed and along a conveyor route between two rows of packing shed workers, said apparatus comprising: a rectangular storage bin having side and end walls, and a substantially horizotnal bottom panel, said panel being movable vertically within said walls; first and second cables each having one end fixed to one side of said panel at symmetrical spaced positions therealong; third and fourth cables each having one end fixed to the other side of said panel at the same positions along the length of said panel that the said first and second cables are fixed thereto; first and second pulleys mounted on said bin near the top of said one side thereof to receive said first and second cables, respectively; third and fourth pulleys mounted on said other bin side to receive said third and fourth cables, respectively; first and second helically coiled springs having one end fixed relative to one end wall of said bin; fifth and sixth cables each having one end connected to the other ends, respectively, of said first and second springs; first pulley means for said fifth and sixth cables; third and fourth helically coiled springs each having one end fixed relative to the other end wall of said bin; seventh and eighth cables each having one end connected to the other ends, respectively, of said third and fourth springs; second pulley means for said seventh and eighth cables; first and second shafts parallel to said end walls positioned centrally of said bin adjacent the lower edges of said side walls, said shafts being disposed symmetrically in said bin; a pair of meshing gears fixed to each pair of adjacent ends of said shafts; first, second, third and fourth arms each fixed at one end to the ends of one of said shafts to rotate from a lower to an upper position as said bin is filled, the other ends of said first, second, third and fourth cables being fixed, respectively, to the other ends of said first, second, third and fourth arms, the other ends of said fifth and seventh cables also being fixed to said other ends of said first and third arms, the other ends of said sixth and eighth cables being fixed to the said other ends of said second and fourth arms; a pair of parallel inverted U-shaped channels mounted in positions inclined downwardly in a predetermined direction along their lengths; a pair of parallel level platforms on opposite sides of said channels; first anti-friction means at the ends of each arm to fit inside said channels; second anti-friction means to fit between said arms and said bin side walls, said pulleys and said pulley means being positioned to pull said arms toward said bin side walls; a level support for said bin between said channels; and means to transport said bin horizontally on said support between said channels with said first anti-friction means inside said channels.

14. Apparatus for transporting produce and the like, said apparatus comprising: a storage bin having vertical wall enclosure means; a substantially horizontal bottom panel movable vertically within said enclosure means; a member on each side of said bin and connected with said bottom panel to move downwardly as said panel moves upwardly; a roller on each of said members; a framework including two spaced parallel inverted U-shaped channels inclined downwardly in a predetermined direction along their lengths, said channels being positioned to fit over the top of said rollers; and means to transport said bin in said predetermined direction, whereby said members are lowered and said bottom panel is raised an amount proportional to movement of said bin in said predetermined direction.

15. The method of handling bulk-like materials, said method comprising the steps of: loading the said materials into a storage bin having an approximately horizontal bottom panel movable vertically in vertical wall enclosure means; transporting said bin along an unloading path of travel; removing said materials from said bin while it is on said path; and raising said panel upwardly to predetermined constant heights as said bin is transported along the path of travel and said materials are unloaded from said bin.

16. The method of handling head lettuce or like products which are highly susceptible to severe physical damage in handling, said method comprising the steps of: loading lettuce into a storage bin having an approximately horizontal bottom panel movable vertically in vertical wall enclosure means; transporting said bin along an unloading path of travel; removing said lettuce from said bin while it is on said path; and raising said panel upwardly to predetermined constant heights as said bin is transported along the path of travel and said materials are unloaded from said bin.

17. The method of handling head lettuce or like products which are highly susceptible to severe physical damage in handling, said method comprising the steps of: loading lettuce into a storage bin having an approximately horizontal bottom panel movable vertically in vertical wall enclosure means; unloading the said lettuce from said bin; and raising said panel upwardly to predetermined constant heights as said bin is transported along the path of travel; thereby keeping the top level of lettuce in said bin at an approximately constant height as said lettuce is unloaded from said bin.

18. The method of handling bulk-like materials, said method comprising the steps of: loading said materials into a storage bin having an approximately horizontal bottom panel movable vertically in vertical wall enclosure means; transporting said bin along an unloading path of travel; removing said materials from said bin while it is on said path; and raising said panel at a rate of speed proportional to that of movement of said bin along said path.

19. The method of handling head lettuce or like products which are highly susceptible to severe physical damage in handling, said method comprising the steps of: loading lettuce into a storage bin having an approximately horizontal bottom panel movable vertically in vertical wall enclosure means; transporting said bin along an unloading path of travel; removing said lettuce from said bin while it is on said path; raising said panel at a rate of speed proportional to that of movement of said bin along said path; and maintaining said panel approximately level as it is both raised and unloaded.

20. The method of loading head lettuce or like products which are highly susceptible to severe physical damage in handling, said method comprising the steps of: dropping lettuce from a release point at an approximately constant height into a storage bin having an approximately horizontal bottom panel movable vertically in vertical wall enclosure means; lowering said panel at a rate to keep the fall of lettuce into said bin approximately constant by keeping each succeeding top layer of lettuce therein at approximately the same distance below said release point; transporting said bin along an unloading path of travel; removing said lettuce from said bin while it is on said path; and raising said panel upwardly to predetermined constant heights as said bin is transported along the path of travel; thereby keeping the top level of lettuce in said bin at an approximately constant height as said lettuce is unloaded from said bin.

21. The method of loading head lettuce or like products which are highly susceptible to severe physical damage in handling, said method comprising the steps of: dropping lettuce from a release point at an approximately constant height into a storage bin having an approximately horizontal bottom panel movable vertically in vertical wall enclosure means; lowering said panel at a rate to keep the fall of lettuce into said bin approximately constant by keeping each succeeding top layer of lettuce therein at approximately the same distance below said release point; maintaining said panel approximately level as it is both lowered and loaded with lettuce; transporting said bin along an unloading path of travel; removing said lettuce from said bin while it is on said path; and raising said panel upwardly to predetermined constant heights as said bin is transported along the path of travel and said materials are unloaded from said bin; and maintaining said panel approximately level as it is both raised and unloaded.

22. The method of loading head lettuce or like products which are highly susceptible to severe physical damage in handling, said method comprising the steps of: dropping lettuce from a release point at an approximately constant height into a storage bin having an approximately horizontal bottom panel movable vertically in vertical wall enclosure means; lowering said panel at a rate to keep the fall of lettuce into said bin approximately constant by keeping each succeeding top layer of lettuce therein at approximately the same distance below said release point; maintaining said panel approximately level as it is both lowered and loaded with lettuce; unloading the said lettuce from said bin; raising said panel upwardly to predetermined constant heights as said bin is transported along the path of travel and said materials are unloaded from said bin; and maintaining said panel approximtely level as it is both raised and unloaded.

23. The method of loading head lettuce or like products which are highly susceptible to severe physical damage in handling, said method comprising the steps of: dropping lettuce from a release point at an approximately constant height into a storage bin having an approximately horizontal bottom panel movable vertically in vertical wall enclosure means; lowering said panel at a rate to keep the fall of lettuce into said bin approximately constant by keeping each succeeding top layer of lettuce therein at approximately the same distance below said release point; transporting said bin along an unloading path of travel; removing said lettuce from said bin while it is on said path; and raising said panel at a rate of speed proportional to that of movement of said bin along said path.

24. The method of loading head lettuce or like products which are highly susceptible to severe physical damage in handling, said method comprising the steps of: dropping lettuce from a release point at an approximately constant height into a storage bin having an approximately horizontal bottom panel movable vertically in vertical wall enclosure means; lowering said panel at a rate to keep the fall of lettuce into said bin approximately constant by keeping each succeeding top layer of lettuce therein at approximately the same distance below said release point; maintaining said panel approximately level as it is both lowered and unloaded with lettuce; transporting said bin along an unloading path of travel; removing said lettuce from said bin while it is on said path; raising said panel at a rate of speed proportional to that of movement of said bin along said path; and maintaining said panel approximately level as it is both raised and unloaded.

References Cited

UNITED STATES PATENTS

| | | | |
|---|---|---|---|
| 1,656,444 | 1/1928 | Morris | 53—391 |
| 3,049,844 | 8/1962 | Leitzel | 53—163 |
| 3,324,623 | 6/1967 | Johnson et al. | 53—163 |
| 3,338,009 | 8/1967 | Stevens | 53—248 X |

TRAVIS S. McGEHEE, Primary Examiner

U.S. Cl. X.R.

53—163, 245, 391; 214—302